Oct. 7, 1952 A. G. COOLEY ET AL 2,613,124

FACSIMILE RECORDER WITH STYLI ACTUATED OR PROPELLED BY A BELT

Filed June 27, 1946 2 SHEETS—SHEET 1

INVENTORS
A. G. Cooley
G. B. Busch
BY E. R. Evans
attorney

Oct. 7, 1952 A. G. COOLEY ET AL 2,613,124

FACSIMILE RECORDER WITH STYLI ACTUATED OR PROPELLED BY A BELT

Filed June 27, 1946 2 SHEETS—SHEET 2

INVENTORS
A.G. Cooley
BY G.B. Busch
E. R. Evans
attorney

Patented Oct. 7, 1952 2,613,124

UNITED STATES PATENT OFFICE 2,613,124

FACSIMILE RECORDER WITH STYLI ACTUATED OR PROPELLED BY A BELT

Austin G. Cooley, New York, and George B. Busch, Brooklyn, N. Y., assignors to Times Facsimile Corporation, New York, N. Y., a corporation of New York Application June 27, 1946, Serial No. 679,703

3 Claims. (Cl. 346—49)

This invention relates to the electrical recording of pictures, messages and other subject matter in facsimile and more particularly to a multi-stylus facsimile recorder of the continuous type.

The principal object of the invention is to provide an improved multi-stylus recorder for high speed operation and constructed to furnish improved copy of high definition.

Another object of the invention is to improve the construction of a recorder of the above-mentioned character in respect to simplicity, reliability and long life.

A further object of the invention is to provide novel means for accurately controlling movement of a plurality of styli in a facsimile machine of the type in which each stylus traverses the same path during the scanning movement for optimum recording, i. e. to minimize distortion of the copy resulting from displacement of the styli with respect to each other.

A still further object of the invention is to provide improved means for producing a record upon a sheet or web of any desired length in a facsimile recorder.

Other objects and advantages of the invention will appear from the following description of a preferred embodiment shown in the accompanying drawings, in which.

Figures 1, 2:
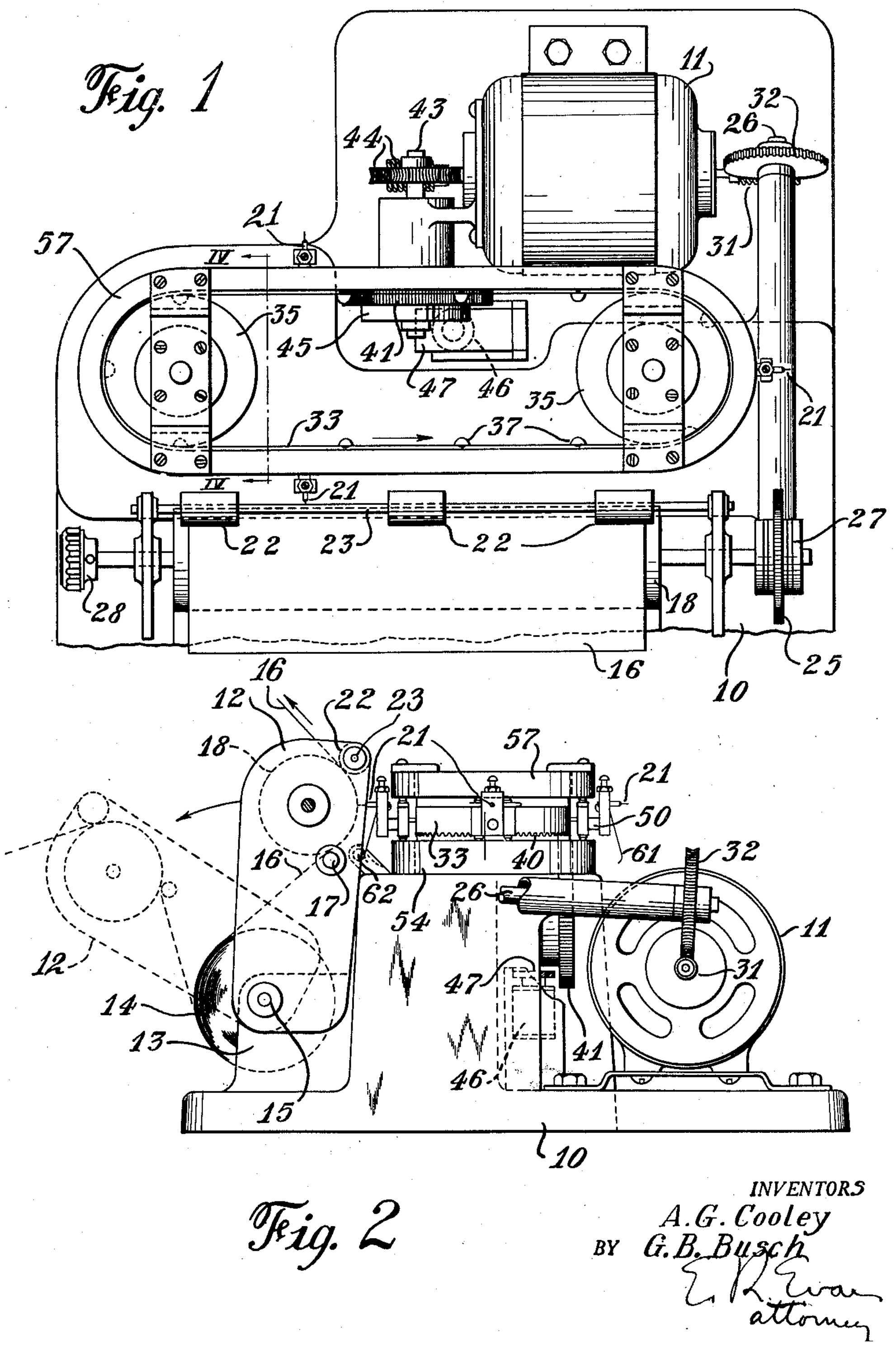
Fig. 1 is a top plan view of a continuous facsimile recorder embodying the invention.
Fig. 2 is a side elevation of the recorder shown in Fig. 1.

Referring to the drawings, the recorder embodying the invention comprises a base 10 upon which is mounted a driving motor 11. At the front of the recorder, opposite the motor 11, a pivoted frame 12 is provided for carrying the roll of recording paper and the sheet or paper feeding mechanism. The frame 12 is pivoted on up-standing lugs 13 on the base 10. A roll 14 of electro-sensitive recording paper is removably supported at the bottom of said frame with its axis in alignment with the pivots 15 thereof.

The recording paper strip or sheet 16 passes between a smooth guide bar 17 and a metallic feed roller 18. The feed roller 18 serves to support the recording sheet in desired relation to the movable recording styli 21 and is positively driven to feed the sheet uniformly during the recording operation. One or more pressure rollers 22 are journalled on the rod 23 and serve to hold the sheet 16 firmly in contact with the feed and supporting roller 18.

In order to load the recorder or thread the recording sheet 16 through the paper feeding frame, it is only necessary to swing the frame outwardly to the position shown in dotted lines in Fig. 2. If desired, clamping means may be provided to hold the frame in the recording position. The drive connection between the shaft of the feed roller 18 and the motor 11 is designed as shown, to permit the drive gear 25 to be disengaged from the cooperating pinion on the shaft 26 when the frame 12 is pulled forward. A friction clutch 27 may be interposed between the roller 18 and the drive gear 25 in order to facilitate manual feeding of the paper by turning the knob 28 when desired. As will be apparent, the gear 25 and shaft 26 are driven from the motor 11 through a worm 31 on the motor shaft and cooperating worm gear 32 on shaft 26.

In a preferred form of the invention illustrated in the drawings, a plurality of styli 21 are caused to traverse the sheet 16 of recording paper from edge to edge in a duplicate scanning movement wherein each stylus traverses exactly the same path across the sheet and, preferably, spaced from the surface thereof to effect recording by an electrical space discharge. In the embodiment shown by way of example, a travelling belt 33 is provided to which are attached three styli through a flexible drive connection, to be described hereinafter, whereby the belt only serves to provide the propelling force to the styli. In order to be operable at a high speed for a long life under service conditions, the belt 33 is preferably formed from a band of metallic spring material having favorable elastic properties in respect to bending and fatigue, such as beryllium copper alloy. Thus an endless belt only a few thousandths of an inch thick may be obtained by rolling a seamless ring lengthwise until the belt is of the proper length.

Figure 4:
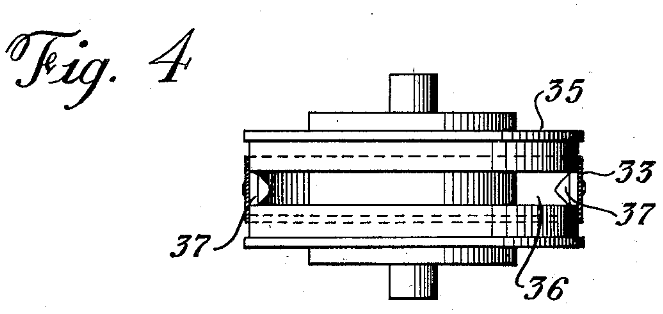
Fig. 4 is a detail view to an enlarged scale of the belt and idler pulley, the belt being shown in section along the line IV—IV of Fig. 1.

As shown the belt 33 is supported on idler pulleys 35 which are mounted on vertical axes on the base 10. The idler pulleys 35, as shown in Fig. 4, are each provided with a circumferential groove 36 to receive the conical buttons or projections 37 attached to the belt 33 along the longitudinal centerline thereof. The projections 37 preferably conform closely at their inner ends to the dimensions of the grooves 36 in the idler pulleys and serve to prevent creeping of the belt up or down on the faces of the pulleys.

In this manner, the belt 33 is maintained in a fixed horizontal plane and, since the strength and flexibility of the belt are not appreciably reduced, it may be operated at a high speed. As the conical projections 37 tangentially enter the grooves in the pulleys 35, the belt is held in position without binding or excessive friction.

For optimum results, the belt 33 is required to be driven at a uniform speed and to move each stylus at exactly the same speed during the traversal of each stylus across the recording sheet. In order to effect this result, the belt is formed with integral teeth 40, preferably along one edge thereof, and a driving gear 41 is provided in position to engage the teeth on the belt; and in this gear the product of the circular pitch and the number of teeth on the gear is equal to the spacing between the styli 21 on the belt 33 so that when the gear makes one revolution, the belt is moved a distance equal to the spacing of the styli on said belt. Thus the belt forms in effect a rack which may be accurately cut to mesh properly with the driving gear 41 and to operate smoothly and at high speed for long service. In addition if, as a result of wear or a slight inaccuracy in the pitch of the teeth, which would cause a slight displacement of each stylus 21 from its proper position at one point in its travel the deviation in position will be exactly repeated for each of the three styli since the gear 41 makes three complete revolutions for each circuit of the belt 33 and the recording styli are equally spaced on said belt. In this manner the effect of imperfections in the drive elements of the belt either due to construction or subsequent wear is greatly reduced and the recording correspondingly improved, since each tooth on the gear 41 always engages the same teeth or contact points on the belt.

Figure 3:
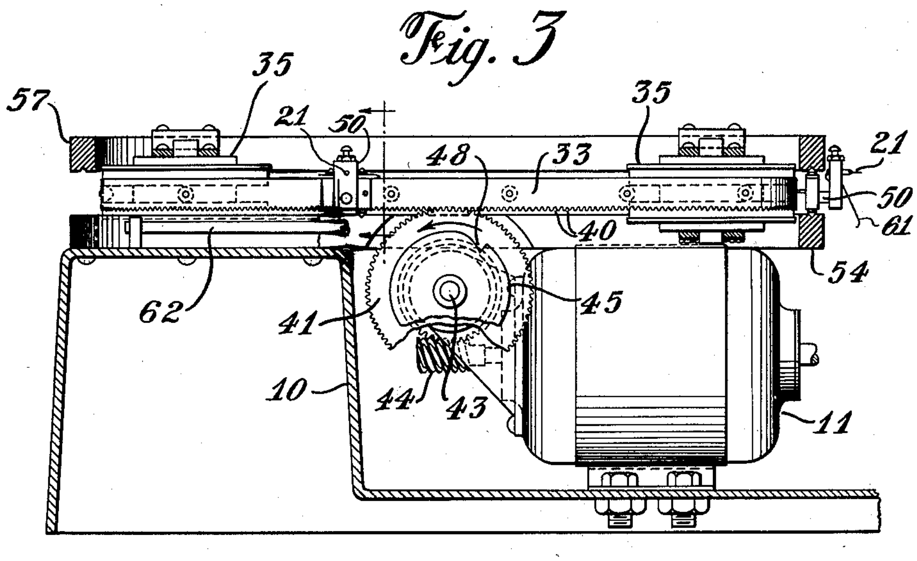
Fig. 3 is a front elevational view, partially in section, of the recorder shown in Figs. 1 and 2.

As shown the driving gear 41 for the belt is mounted upon a second drive shaft 43 which is connected through gearing 44 to the shaft of motor 11, which is synchronized with the transmitting scanning mechanism as well known in the art. The shaft 43 also carries a latch plate 45 attached to and rotating with the drive gear 41 and driven through a slip friction clutch (not shown). A phasing magnet 46 mounted below the inner end of the shaft 43 is provided with a hinged armature 47 for controlling the rotation of the latch plate and gear 41. The armature 47 is urged by a spring toward its uppermost position where the end of the armature will engage a notch 48 (see Fig. 3) in the latch plate or disc 45 and thereby stop the movement of the belt 33 and the recording styli thereon. It will be noted that in this position of the phasing mechanism, one of the styli 21 will be arrested at the left-hand edge of the recording sheet (as viewed in Fig. 1) in a position to commence a scanning excursion across the sheet. When the phasing pulse is received, the magnet 46 is energized and the attraction of the armature 47 releases the latch plate 45 to initiate the movement of the belt 33 by reason of the rotation of the cooperating drive gear 41. Since the rotation of the shaft and gear 41 is synchronized with the transmitter scanning mechanism, the direct driving engagement of the gear with the belt 33 maintains the belt in synchronism with the progressive movement of the remote scanning mechanism.

Figure 5:
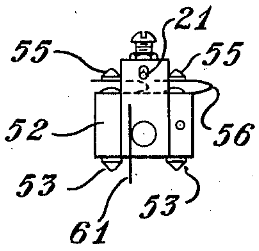
Figs. 5 and 6 are detailed views of the stylus holder drawn to an enlarged scale.
Figure 6:
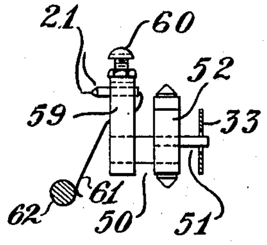
Figure 7:
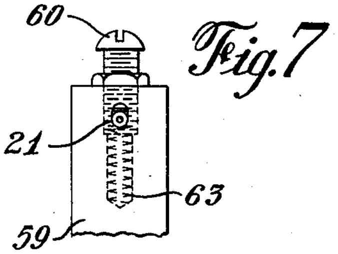
Fig. 7 is a detailed view of the stylus clamp.
Figure 8:
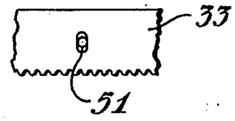
Fig. 8 is a detailed view showing the driving connection between the moving belt and the stylus holder.

Since the belt 33 must be flexible and elastic though comparatively strong, it is relatively thin and is employed to propel but not to position the styli 21. In order to guide the styli, both horizontally and vertically, during the travel thereof over the surface of the recording paper, each stylus is mounted upon a stylus holder 50 which is provided with a projecting pin 51 which extends into a vertical slot in the belt 33 as shown in Figs. 6 and 8. In this manner the stylus holder 50 is propelled but not positioned vertically or laterally by the belt. The construction of the stylus holder is shown to an enlarged scale in Figs. 5 and 6. In its preferred form, the stylus holder comprises a guide block 52 having a pair of lower guide points 53 adapted to slide in a fitted groove in the fixed endless track member 54 positioned adjacent the belt 33 (see Fig. 3). The block 52 of the stylus holder is also provided with two upper guide points 55 carried on a resilient leaf or bar 56 and adapted to slide in the groove in the upper guide bar or track 57 paralleling the track 54.

The stylus holder 50 also comprises an upright post 59 rigidly fastened to the guide block 52. The stylus 21 is mounted in said post, as shown, and secured in any suitable manner, as by a setscrew 60, to project perpendicular to the recording surface. The cavity in the supporting post to receive the stylus 21 may be elongated in a vertical direction, as shown, to permit vertical adjustment at the point of the stylus by compression of a spring 63 beneath the stylus so that the paths of the respective styli across the recording sheet will exactly coincide. A spring contact arm 61, electrically connected to the stylus 21, projects in front of the stylus holder into a position where it will engage the stationary contact bar 62 during the time interval when the stylus is in position to record on the recording sheet 16.

Recording is preferably effected by a space discharge between the tip of the stylus 21 and the surface of the sheet 16, and the discharge is preferably of the character described in our prior Patent, No. 1,702,595 dated February 19, 1929, which has been termed "corona" discharge to differentiate it from a disruptive spark discharge which causes burning and perforation of the recording sheet. While not limited thereto, it is found that sharper recording and other advantages result from the use of corona discharge on the dry electro-sensitive papers in current use. In addition, the wear on the stylus produced by contact with the surface of the recording sheet is eliminated.

The working parts of the machine may be insulated from the voltages employed for recording by insulating the bar 62 and the stylus 21 from the base and frame of the machine. The grounded side of the signal amplifier would normally be connected to the feed roll 18 and thus establish a circuit for recording current flowing from the stylus to and through a recording sheet. However any suitable electrical recording arrangement may be employed.

It will be apparent that in accordance with the invention a construction of facsimile recorder is provided which permits operation at a high speed because of the strength and flexibility of the belt and the light weight of the moving parts. On the other hand the recording styli are so accurately guided and controlled in position that even at high speeds the positions of the respective styli in relation to the recording surface will coincide so exactly that the recording will be of high definition and will not present the ragged or jagged appearance which has usually been associated with continuous recorders of this type. Various modifications in the detailed construction shown and described above for the purpose of explaining the invention will occur to those skilled in the art. For example the detailed construction of the stylus supporting elements may be varied without sacrificing the advantages derived from the driving gear 41 and the thin endless belt 33 having drive teeth formed therein. The construction of the belt may also be modified without departing from the principles outlined above. Various other modifications in the preferred form of the invention illustrated may be made without departing from the scope of the invention as defined in the appended claims.

We claim:

1. In a facsimile recorder of the character described, feeding means for a continuous length of recording paper, a travelling belt having a straight section in opposed relation to the recording area of said length of recording paper, said belt comprising an endless flexible metallic strip provided with integral teeth along one edge thereof, recording styli moved successively by said belt across the recording area, a drive gear engaging the teeth in said belt and motor means for driving said gear.

2. In a facsimile recorder having a recording medium in the form of a continuous web and a synchronous drive shaft operating at a speed corresponding to that of the transmitter scanning mechanism, a flexible metallic belt having a serrated edge forming longitudinal integral teeth along the entire length of the belt, a pair of idler pulleys for supporting said belt adjacent the face of the recording web, recording means for marking the web including a movable current-conducting stylus attached to said belt to be advanced across the width of the recording medium exactly in conformity with the forward movement of said belt, and a gear coupled to said drive shaft and meshing with the teeth on the edge of said belt to maintain exact synchronism of the belt-propelled stylus with the transmitter scanning mechanism and minimize distortion of the recording effected thereby.

3. In a facsimile recorder having a recording medium in the form of a continuous web, a flexible belt disposed adjacent the recording medium, a pair of idler pulleys for supporting said belt with a straight section thereof adjacent the surface of the recording medium, recording means for marking the web including a movable current-conducting stylus attached to said belt to be advanced across the width of the recording medium as the belt travels, a synchronous drive shaft operating at a speed corresponding to that of the transmitter scanning mechanism and positive driving means for the belt, said driving means comprising said synchronous drive shaft and toothed elements integral with said belt.

AUSTIN G. COOLEY.
GEORGE B. BUSCH.

REFERENCES CITED

The following references are of record in the file of this patent:

UNITED STATES PATENTS

| Number | Name | Date |
|---|---|---|
| 232,156 | Thomsen | Sept. 14, 1880 |
| 866,298 | Paris | Sept. 17, 1907 |
| 1,291,351 | Alexander | Jan. 14, 1919 |
| 1,828,136 | Freedlander | Oct. 20, 1931 |
| 2,000,046 | Stevens | May 7, 1935 |
| 2,127,331 | Fulton | Aug. 16, 1938 |
| 2,278,919 | Erickson et al. | Apr. 7, 1942 |
| 2,384,515 | Wise | Sept. 11, 1945 |
| 2,397,312 | Forrest | Mar. 26, 1946 |
| 2,501,236 | Ryan et al. | Mar. 21, 1950 |